R. HUFF.
SPEED CONTROL FOR MOTOR CARS.
APPLICATION FILED MAY 27, 1907.
1,077,348.
Patented Nov. 4, 1913.
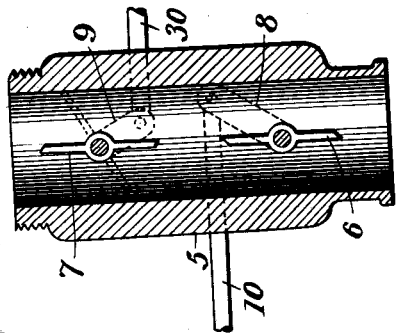
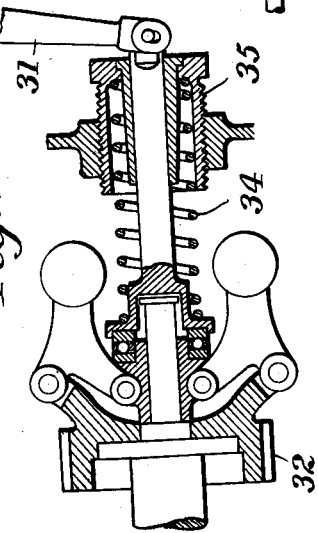
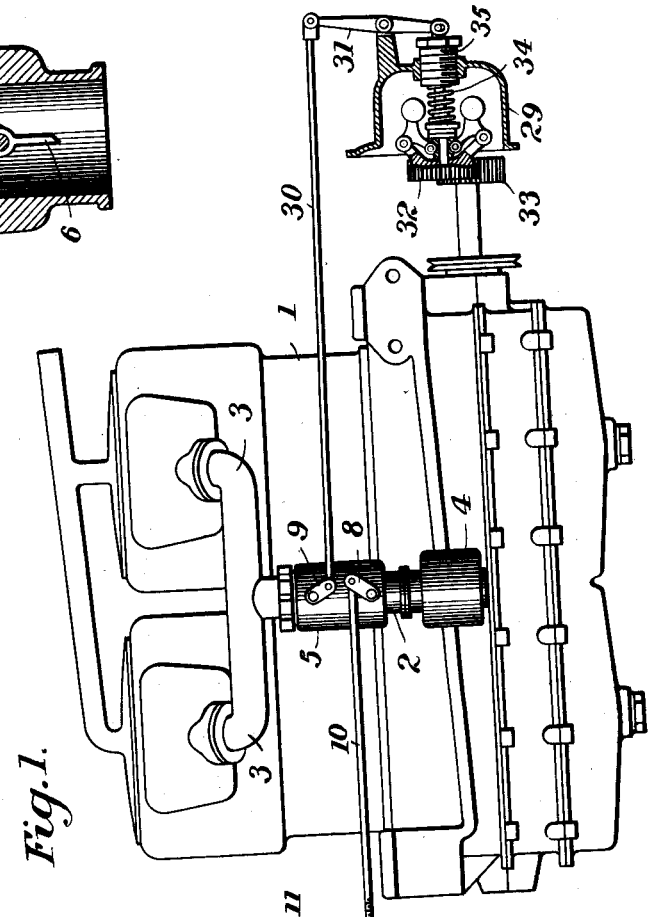
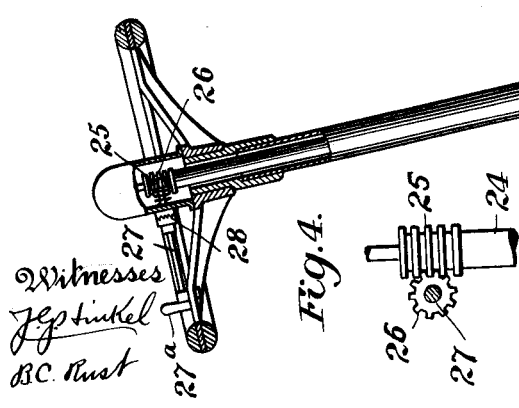
Inventor
Russell Huff
Witnesses
J. P. Stinkel
B. C. Rust

UNITED STATES PATENT OFFICE.

RUSSELL HUFF, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

SPEED CONTROL FOR MOTOR-CARS.

1,077,348.      Specification of Letters Patent.      Patented Nov. 4, 1913.

Application filed May 27, 1907. Serial No. 375,961.

*To all whom it may concern:*

Be it known that I, RUSSELL HUFF, a citizen of the United States, and resident of Detroit, Wayne county, State of Michigan, have invented certain new and useful Improvements in Automatic Speed Control for Motor-Cars, of which the following is a specification.

The present invention is designed chiefly for use on motor trucks or other motor vehicles, for the purpose of preventing the drivers thereof from running the vehicles at unlawful or dangerous rates of speed, and to permit of the maximum rates of speed at which the vehicles may be run being predetermined and fixed beyond the control of drivers.

A further object is to provide devices by which the speed of the vehicle may be controlled by the driver within a predetermined maximum limit.

Other objects will appear from the following detail description, taken in connection with the accompanying drawings, in which, Figure 1 is a general view showing one embodiment of the invention as applied to a motor vehicle; Fig. 2 is an enlarged sectional view of the valve casing showing the arrangement of valves therein; Fig. 3 is an enlarged sectional view of the governor; Fig. 4 is an enlarged view of part of Fig. 1.

Referring to the drawing, 1 represents somewhat diagrammatically a type of internal combustion engine having a plurality of cylinders, and 2 designates an inlet pipe having branches 3 through which the explosive mixture passes from the carbureter 4 to the cylinders of the engine. A valve casing 5 forming a section of said inlet pipe 2 incloses valves 6 and 7 which are arranged in series or succession therein, so that either may be operated to entirely close pipe. Said casing and valves are best shown in Fig. 2. An arm 8 is connected to the valve 6 and a similar arm 9 is connected to the valve 7 whereby said valves may be opened or closed to increase or decrease the amount of explosive mixture passing through the pipe to the cylinders of the engine.

To the arm 8 of valve 6 is connected means for holding it yieldably in a normal position, means for varying said normal position at will, and means for instantly throwing said valve open to accelerate the speed of the engine without disturbing either of the foregoing means. These means comprise the rod 10 connected to the arm 8 at one end and connected near the other end to one arm 11 of the foot lever 12. This rod is held in normal position by the arm 13 of a bell crank lever arranged between springs 15 and 16 surrounding the rod. The tension and position of these springs may be adjusted by nuts 17 and 18. It will thus be seen that by moving the arm 13 of the bell crank lever the rod 10 and consequently the arm 8 may be moved to operate the valve 6 for the purpose of varying its normal position, and by moving arm 11 by pressing the pedal 19 as shown in Fig. 1, the position of said valve may be instantly changed, the rod 10 moving against the tension of the spring 16.

The means for varying the normal position of the valve 6 will now be described.

To arm 14 of the bell crank lever is pivoted a link 20 and the other end of said link is pivoted to a collar 21 surrounding the steering column 22 and adapted to move longitudinally thereon. Said collar 21 is operatively connected through slots 23 with the rod 24 in said column. The other end of said rod projects from the column adjacent the steering wheel and is provided with a rack 25 meshing with the pinion 26 on the transverse shaft 27, said shaft being adapted to be turned by the handle 27$^a$ and held in any desired position by the clutching member 28, which permits said shaft to be set at any desired position at the will of the operator. It will thus be understood that the valve 6 is yieldably locked by the clutch 28 in any desired position to permit a normal quantity of explosive mixture to pass to the cylinders of the engine through the pipe 2 and that the speed of the engine may be instantly accelerated by pressure on the pedal 19 operating the rod 10 against the spring 16, to open wide the throttle valve 6.

The valve 7 is operably connected with a centrifugal governor 29 through its arm 9, rod 30 and lever 31, as clearly shown in Fig. 1 of the drawings. The centrifugal governor 29 is of the ordinary type, being suitably connected with the engine shaft as by gears 32 and 33. Its spring 34 is preferably a stiff one and when the governor is acting to close the throttle valve 7 said spring is under considerable initial compression whereby when the speed of the engine falls slightly below the point to which the spring is adjusted said spring acts suddenly to open the throttle valve wide and restore the control of the engine to the driver. The speed at which the governor will close the valve 7 may be varied by adjusting the tension of the spring by means of the nut 35.

From the above description it will be noted that the valve 7 is absolutely under the control of the governor 29 there being no connection between it and the driver's seat, and that therefore when the governor is set to permit the engine to run at a predetermined maximum speed there can be no tampering whatever with the operation thereof by the driver of the vehicle. On the other hand, when the engine is running below the maximum speed permitted by the governor valve, the engine is under perfect manual control by the manipulation of the valve 6, as above set forth. This combination of manual and automatic control is found to be very valuable in avoiding unlawful or excessive speeds without interfering with the free control and manipulation of the vehicle at any speeds within the prescribed limit.

Having described my invention what I claim and desire to secure by Letters-Patent is—

In a motor vehicle, the combination of a motor, a governor for the motor, a motive fluid intake pipe for the motor, two independent throttle valves in said pipe, means operatively connecting one of said valves with the governor whereby the governor is adapted to control the supply of motive fluid to the motor when the motor exceeds a predetermined speed, a pedal lever, means operatively connecting said lever with the other of said valves, and a hand lever flexibly connected with said means whereby said other valve is adapted to be independently operated by either lever, said levers being accessible to the vehicle driver when operating the vehicle, and said governor and its connection with the valve controlled thereby being inaccessible to the driver when operating the vehicle.

In testimony whereof I affix my signature in presence of two witnesses.

RUSSELL HUFF.

Witnesses:
L. C. TENNEY,
ALLEN LOOMIS.